Feb. 26, 1935.  A. P. LEWIS  1,992,490
NOZZLE
Filed Aug. 11, 1932
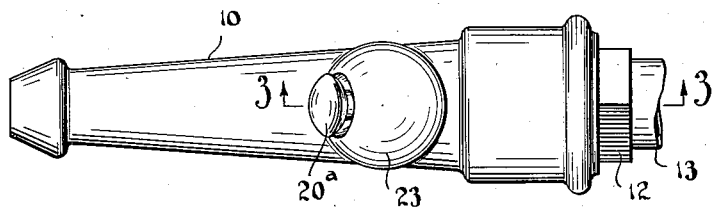
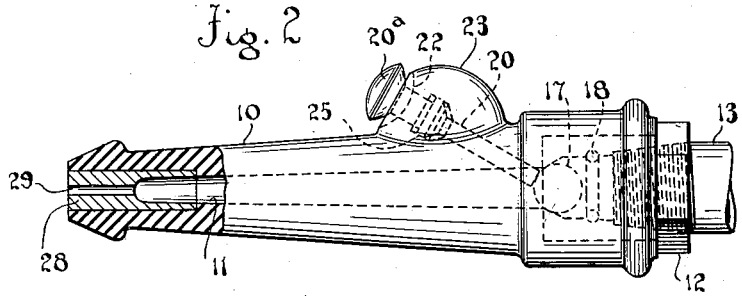
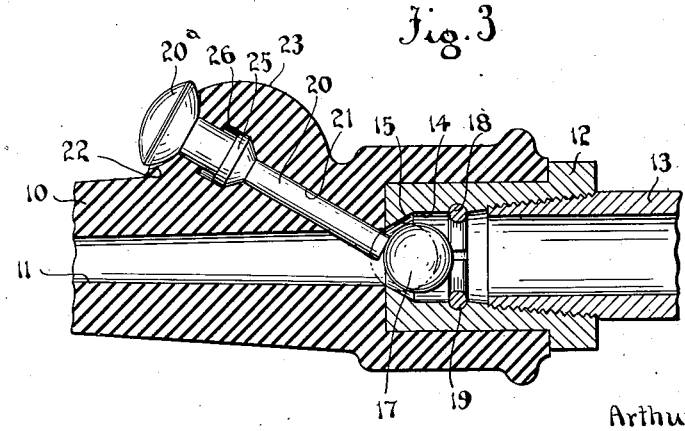
INVENTOR
Arthur P. Lewis
BY
ATTORNEYS Patented Feb. 26, 1935

1,992,490

UNITED STATES PATENT OFFICE 1,992,490

NOZZLE

Arthur P. Lewis, Akron, Ohio, assignor to The Firestone Tire & Rubber Company, Akron, Ohio, a corporation of Ohio Application August 11, 1932, Serial No. 628,304

2 Claims. (Cl. 299—150)

This invention relates to nozzles, and more especially it relates to nozzles made from relatively stiff soft rubber composition.

The nozzle embodying this invention is designed for use with air-blast equipment, and is especially useful on air-blast hose used for cleaning molds and the like, in which situation its rubber structure obviates marring or damage to the mold in the event that it accidentally strikes the same.

The chief objects of the invention are to provide an improved nozzle of rubber composition; to provide simple and efficient valve mechanism for such a nozzle; and to provide such a nozzle that may be economically manufactured. Other objects will be manifest.

Of the accompanying drawing:

Figure 1 is a plan view of the nozzle, in its preferred form, and a portion of a hose to which the nozzle is attached;

Figure 2 is a side elevation thereof, parts being broken away and in section; and Figure 3 is a section on the line 3—3 of Figure 1.

Referring to the drawing, the improved nozzle comprises a tubular body structure 10 consisting of molded, relatively stiff, soft rubber composition having a tapered axial bore 11 therein, and a tubular metallic insert or fixture 12 molded into one end portion thereof, said fixture 12 being interiorly threaded for attachment to a hose 13 or the like.

The fixture 12 is formed with an axial passage 14 that is somewhat larger than the bore 11 of the body structure 10, and tapers sharply at 15 down to the same diameter as said bore 11. The tapered portion 15 constitutes a valve seat for a ball valve 17 that is retained in the passage 14 by a split ring 18 that seats in a circumferential recess 19 formed about the passage 14, the inside diameter of the ring 18 being less than the diameter of the ball valve 17. The arrangement is such that pressure fluid entering the nozzle through the fixture 12 normally forces the ball valve 17 against the valve seat 15 so as to prevent egress of said fluid through the nozzle bore 11, as is shown in Figure 2 of the drawing.

For unseating the ball valve 17 to permit pressure fluid to flow through the nozzle, a manually operable plunger 20 is slidably mounted in a suitable bore 21 formed in the body structure 10, obliquely with relation to the bore 11, the inner end of the bore 21 intersecting the bore 11 in front of the ball valve 17. The outer end of the bore 21 terminates in a concave socket 22 formed in a hemispherical protuberance 23 that is formed on one side of the body structure 10, said socket being shaped to receive a rounded head 20a formed on the outer end of the plunger 20.

Intermediate its end portions the plunger 20 is formed with a flange 25 that tapers toward the inner end of said plunger, said flange being received in a complementally shaped recess 26 formed interiorly of the protuberance 23. The recess 26 is of somewhat greater axial length than the flange 25 so as to permit determinate longitudinal movement of the plunger 20 in the bore 21. The flange 25 is so shaped that it may be mounted in the recess 26 simply by forcing it through the bore 21, the tapered leading face of the flange serving to spread the surrounding rubber structure. Once the flange is in the recess 26 it cannot readily be removed therefrom.

As is most clearly shown in Figure 3, the plunger 20 engages the ball valve 17 in front of the valve seat 15 so that there is no leakage of fluid past the ball valve when the plunger is in the normal inoperative position shown in Figure 2.

An axial metal sleeve 28 is molded into the body structure 10 at the delivery end thereof, said sleeve having an axial bore 29 of smaller size than the bore 11 communicating with the latter. The metal sleeve 28 will resist erosion by the fluid better than rubber, and assures that the fluid jet always will be the proper size to give optimum results.

The nozzle is easily manufactured, and has the minimum of moving parts to get out of order. It performs efficiently and achieves the other advantages set out in the foregoing statement of objects.

Modification may be resorted to without departing from the spirit of the invention or the scope of the appended claims, which are not limited wholly to the specific construction shown and described.

What is claimed is:

1. In a nozzle, the combination of a body structure of relatively stiff soft rubber composition formed with an axial main bore and a valve bore at an angle thereto, a portion of said valve bore being formed with an enlarged recess intermediate its ends, a metal fixture in one end of said body structure formed with a continuation of said main bore including a valve seat, a ball-valve cooperating with said valve seat, and a plunger slidably mounted for axial movement in said valve bore so as to unseat the ball-valve, said plunger being formed with a flange of less longitudinal extent than that of said recess and having a tapered face on the side toward said ball valve, whereby said flange may be disposed within said recess by distorting the rubber body structure by means of said tapered face.

2. In a nozzle, the combination of a body structure of relatively stiff soft rubber composition formed with an axial bore, a valve structure mounted therein adapted to be closed by the pressure of fluid to be delivered through the nozzle, and a movable plunger extending through a bore in the wall of the nozzle, said bore being formed with an enlargement intermediate its ends, said plunger being formed with an enlargement of less longitudinal extent than said enlargement in said bore intermediate its ends and being adapted to be snapped into assembled position by distorting the rubber body structure of the valve, to dispose the plunger enlargement within the recess enlargement, the inner end of said plunger being disposed within the said bore in engagement with the valve so as to open the latter when depressed.

ARTHUR P. LEWIS.